US006965646B1

(12) United States Patent
Firestone

(10) Patent No.: US 6,965,646 B1
(45) Date of Patent: Nov. 15, 2005

(54) MPEG FILE FORMAT OPTIMIZATION FOR STREAMING

(75) Inventor: Scott S. Firestone, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 595 days.

(21) Appl. No.: 09/606,419

(22) Filed: Jun. 28, 2000

(51) Int. Cl.$^7$ .............................................. H04N 7/18

(52) U.S. Cl. ............................. 375/240.26; 375/240.27

(58) Field of Search ....................... 375/240.25–240.29

(56) References Cited

U.S. PATENT DOCUMENTS

| | | | | |
|---|---|---|---|---|
| 6,154,780 A | * | 11/2000 | Zhu | ............................ 709/236 |
| 6,201,834 B1 | * | 3/2001 | Zhu | ....................... 375/240.27 |
| 6,421,387 B1 | * | 7/2002 | Rhee | ...................... 375/240.27 |
| 6,480,537 B1 | * | 11/2002 | Agrawal et al. | ............. 375/240 |

OTHER PUBLICATIONS

Website printout from www.apple.com/quicktime/products/tutorials, "What is Quicktime?", downloaded Oct. 30, 2000, 2 pages.

* cited by examiner

Primary Examiner—Andy Rao
(74) Attorney, Agent, or Firm—Beyer Weaver & Thomas LLP

(57) ABSTRACT

MPEG data is packetized and streamed using a two phase procedure. First, the system parses MPEG data and reformats it into RTP sized packets in preparation for conversion to an RTP stream. This reformatting phase is done prior to streaming and typically only performed once for each MPEG file and network type. After reformatting, the MPEG data is contained in a modified MPEG bitstream that includes annotations that inform a network server that the modified MPEG stream is specially reformatted to facilitate RTP packetization. In the second phase, a network server encapsulates the reformatted MPEG data within RTP packets and streams the data onto the network for real-time playback. As a result of reformatting the MPEG data prior to transmission, the real-time demands of an MPEG to RTP conversion are greatly reduced.

38 Claims, 9 Drawing Sheets

| | #1 | #2 | #3 | #N |
|---|---|---|---|---|
| TYPE | video | audio | audio | NGOP |
| INDEX #1 | 100010 | 101010 | 101101 | 102100 |
| LENGTH | 1010 | 1001 | 0101 | not used |
FIG. 3C
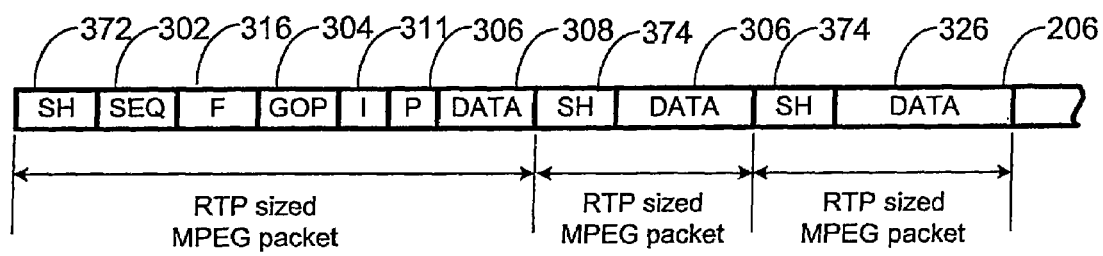
FIG. 3D
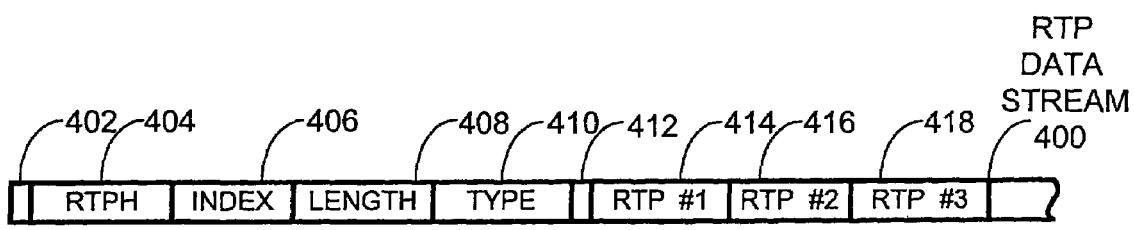
FIG. 4

MPEG FILE FORMAT OPTIMIZATION FOR STREAMING

BACKGROUND OF THE INVENTION

The present invention relates generally to streaming compressed MPEG content in a network. More particularly, the present invention relates to systems and methods for reformatting MPEG files to increase transmission performance in a network.

MPEG is a popular standard for converting multimedia content into high bit rate digital signals. Using coding specifications provided by the MPEG standard, audio and video information may be compressed into an MPEG stream. This MPEG stream may then be packetized for network transmission onto a network from a server. The server is responsible for packetization of the MPEG stream using network protocol. A goal of the server is to transmit the compressed stream at a low enough bit rate such that it can make economic use of available transmission bandwidth. At some other location in the network, a "viewer" receives the streaming media. The viewer machine unpacks the data from each network packet, and sends the data to an MPEG decompressor. The decompressor passes decompressed data to a renderer. For video data, each frame of video will be decompressed and then passed to a video renderer, which will display the image on a monitor. For audio data, the data will be decompressed and then passed to an audio renderer, which will drive a speaker.

FIG. 1A illustrates a conventional system 100 for packetizing MPEG files for network transmission. The system 100 includes a media file 102, such as a movie, which contains compressed synchronized audio and video streams. The audio and video streams within the media file 102 are provided in a multiplexed format. An MPEG server 103, or "streamer," reads the file 102 from a storage device such as a hard disk and transmits the file 102 onto a network 106 in real time. The MPEG server typically includes at least two components: a packetizer 104 and a network interface 105.

Before the data in the media file 102 can be sent onto the network 106, the packetizer 104 must encapsulate the file in network packets using a network packetization protocol. The protocol, or standard, will designate a number of rules for packetization of the data for the network 106. By way of example, the rules may specify how the MPEG bitstream is to be parsed. A common network packetization protocol for elementary streams is the Real Time Protocol (RTP) network packetization protocol. See for example RFC-2250 "RTP Payload Format for MPEG1/MPEG2 Video", January 1998, and RFC-1889 "RTP: A Transport Protocol for Real-Time Applications", January 1996. Both of these documents are incorporated herein by reference for all purposes.

The packetizer 104 may begin by demultiplexing the audio and video streams in the media file 102. The packetizer 104 then produces a series of network packets, each of which contains a portion of data from the media file 102 along with a network packet header. The network packet header includes additional information useful for transmission in the network 106. An input buffer 108 may also be included for temporarily holding the data before streaming onto the network 106. Upon request, the network interface 105 sends the packetized RTP packets onto the network 106 in real-time.

The media file 102 has its own packetization protocol, which is distinct from the network packetization protocol. FIG. 1B illustrates an exemplary elementary MPEG stream 120, which may be found in the MPEG file 102. The elementary MPEG stream 120 is segmented into hierarchical sections, each comprising multiple pictures or frames. At the beginning of each hierarchical block is a header sequence 124. The header sequence 124 typically includes at least one of a sequence header 126, a Group of Pictures (GOP) header 128 and a picture header 130. Each header begins with a unique start code to signal the beginning of the header. A GOP header 128 is placed at the beginning of a Group of Pictures (GOP) 132 which typically consists of a set of pictures 134a and 134b related to one another by common use of some temporally redundant information in the pictures. Each picture within set 134 includes its own picture header 136 and a frame 138. The picture header 136 precedes the frame 138, which follows it. The frame 138 contains picture data, which is divided into a number of slices 142. Each slice includes a slice header 144 and slice data 146.

FIG. 1C illustrates the repacketization of the MPEG packets from the elementary stream 120 into RTP packets. As shown, an RTP stream 150 is the elementary MPEG stream 120 after it has been divided into multiple RTP packets. A first RTP packet 152 contains an RTP packet header 153a and a payload 151. In this example, the payload 151 includes the sequence header 126, the GOP header 128, the picture header 130 and some data from the first frame 140. RTP packet headers 153a, 153b and 153c specify the size of the RTP packet used in the RTP stream 150.

When converting the MPEG stream 120 into the RTP stream 150, a number of rules must be followed according to the RTP standard. One rule requires that the packetizer 104 create the RTP network packet header 153 using certain data in the MPEG header sequence 124. A second rule specifies how the bitstream is parsed relative to start code in the header sequence 124. Specifically, any start code must appear at the beginning of an RTP packet. For example, a sequence header (e.g., header 126), when present, will always be placed at the beginning of a new RTP packet. Similarly, a GOP header such as header 128, when present, will always be placed at the beginning of a new RTP packet or will follow a sequence header if present. Further, a picture header (e.g., picture header 130), when present, will always be placed at the beginning of a new RTP packet, or will follow a GOP header if present. Unfortunately, the packetizer 104 typically does not know where any of these elements are located and must comb through every byte in the MPEG stream 120 to find them, resulting in considerable computational effort.

The packetizer 104 will fragment or aggregate media packets into network packets according to their respective sizes. Media packets are generally described as constant-sized packets containing either video or audio data. Specifically, if the size of a media packet in media file 102 is larger than the optimal network packet size, the packetizer 104 will fragment the large media packet into two or more successive network packets. On the other hand, if the size of a media packet in media file 102 is smaller than the optimal network packet size, packetizer 104 may aggregate two or more media packets into a single network packet—so long as this would not place a start code at a forbidden location within the RTP packet. This may have varying effects depending on the RTP packet protocol which is being implemented on the network 106. For constant-size RTP packets as found in an ATM network, any unfilled portions of a constant-size RTP packet will be "padded" by, for example, filling the remainder of the packet with zeros. For variable-size RTP packets as found in an Ethernet network, for example, the variable-size packet is truncated such that it is shorter than a maximum size specified by the relevant network protocol.

Typically, the packetizer 104 will segment the MPEG bitstream by putting as much data into an RTP packet as possible. When the packetizer 104 runs into any of the three start codes, the bitstream that begins with that sequence start code will begin at the beginning of a fresh RTP packet. As a result, some of the previous RTP packet may be left unfilled. By way of example, if the first RIT packet 152 is not large enough to accommodate all the data from the first frame 140, some of the first frame data will spill into a portion 154 of a second RTP packet 156. After the data from the first frame 140 has been entered into the RTP stream 150, the next picture header 136 is placed at the beginning of a new RTP packet 158 in RTP packet 153c. In this case, all the frame data from frame 138 can fit into the third RTP packet 158. As the RTP stream 150 includes variable size RTP packets, RTP packet 156 is smaller than RTP packet 152. Similarly, RTP packet 156 is also smaller than RTP packet 152.

Another common constraint imposed by the RTP protocol is on the fragmentation of slices. More specifically, the beginning of a slice must either be located at the beginning of an RTP payload (after any start code) or must follow after some integral number of slices in a packet. It must not follow a part of a slice that has been divided between two RTP packets. This requirement insures that the beginning of the next slice after one with the missing slice can be found without requiring that the receiver scan packet contents. The slices may be fragmented across RTP packets as long as the above rules are met. By way of example, for the frame 140, one slice within the frame 140 may be fragmented between the first RTP packet 152 and the second RTP packet 156. However, no other slices within the frame 140 may be added to RTP packet 156.

There are several problems commonly encountered when repacketizing MPEG data into RTP packets. First, the server 103 must parse the entire MPEG bitstream, bit by bit, in order to determine how it will carve the MPEG system stream. More specifically, it must parse the entire MPEG bitstream to apply the protocol rules to locate appropriate start and end points for each RTP packet. In addition, the server must gather information to create the RTP packet headers. This parsing and information gathering imposes substantial processing load on the server CPU and may limit the ability of the server 103 to deliver real-time multimedia.

The second problem arises because two copy operations are required to parse the bitstream. The first copy operation transfers the MPEG data from the file 102 into the buffer 108 where it is parsed. The second copy operation moves the data from the buffer 108 into the network packets. These two copy operations require significant CPU processing load, which again may limit the ability of the server 103 to deliver real-time multimedia.

As result of the significant CPU processing load required to parse the entire MPEG bitstream and create RTP packets, the speed of the server 103 is limited. This problem can become so significant that the server cannot serve MPEG data fast enough to meet the requirements of real time streaming. In view of the foregoing, improved systems and techniques for MPEG to RTP repacketization would be desirable.

SUMMARY OF THE INVENTION

The present invention provides improved systems and methods for packetizing and streaming multimedia data. For example, the invention may facilitate packetizing MPEG data (or other media data) into network packets (e.g., RTP packets). The overall procedure may be divided into two phases. First, the system parses MPEG data and reformats it for rapid conversion into network packets. This reformatting phase is done prior to streaming and typically only performed once for each MPEG file and network type. After reformatting, the modified MPEG stream includes annotations that inform a network server how to packetize the MPEG stream into network packets. In the second phase, a network server encapsulates the reformatted MPEG data within network packets and streams the data onto the network. As a result of reformatting the MPEG data prior to transmission, the delivery demands of packetizing an MPEG file are greatly reduced.

In one aspect, the present invention takes advantage of the flexibility of MPEG packet design which allows for MPEG packets to be variably sized. In this manner, an MPEG bitstream may be reformatted by annotating the bitstream with network packet information specifying the network packet boundaries according to a network packet size used during transmission. The MPEG stream may be annotated according to network packets having a constant or variable size. After an MPEG bitstream has been annotated, it contains network sized MPEG packets and is considered a modified MPEG bitstream. The modified MPEG bitstream having network sized MPEG packets may be stored until transmission onto the network.

To facilitate a streamer which is responsible for dividing the bitstream and block copying the RTP sized MPEG packets into network packets at transmission time, the streamer must know the starting and ending points of all the network sized MPEG packets in the modified system stream. According to one embodiment, the streamer reads network packet information inserted into the modified MPEG bitstream. In a specific embodiment, the network packet information is an index. The index includes all the start and end points for the network sized MPEG packets in the modified MPEG bitstream. Correspondingly, the streamer will not have to search or parse the MPEG bitstream at transmission time.

In another embodiment, the network packet information is inserted within or appended onto the Group of Pictures (GOP) headers in a video MPEG bitstream. Each GOP header then comprises a user defined space which includes the network packet information used to facilitate network transmission of data within the group of pictures. In one embodiment, the GOP header includes the network packet information which provides the starting byte indexes and lengths of MPEG packets within that group of pictures. In embodiments where the media file includes audio and video streams multiplexed together, the network packet information includes the starting byte indexes of packets in both the audio and video streams.

In one aspect, the invention relates to a method of preparing a compressed audio, video, or multimedia bitstream to facilitate real-time streaming of the bitstream. The method includes parsing the bitstream to identify network packet boundaries in the bitstream. The method also includes annotating the bitstream with network packet information specifying the network packet boundaries such that a streaming apparatus can use the network packet information and rapidly divide the bitstream into network packets for real-time streaming.

In another aspect, the invention relates to a computer program product comprising a machine readable medium on which is provided instructions for preparing a compressed audio, video, or multimedia bitstream to facilitate real-time streaming of the bitstream. The instructions including instructions for parsing the bitstream to identify network packet boundaries in the bitstream. The instructions also including instructions for annotating the bitstream with network packet information specifying the network packet boundaries such that a streaming apparatus can use the network packet information and rapidly divide the bitstream into network packets for real-time streaming.

In yet another aspect, the invention relates to a method of performing real-time streaming of a bitstream. The method includes parsing the bitstream to identify network packet boundaries in the bitstream. The method also includes annotating the bitstream with network packet information specifying the network packet boundaries. The method further includes storing the annotated bitstream. The method additionally includes block streaming the bitstream in real-time using the network packet information to divide the bitstream into network packets.

In still another aspect, the invention relates to a system for transmitting a compressed audio, video, or multimedia bitstream. The system includes a demultiplexer. The system also includes one or more buffers. The system additionally includes a segmentor capable of annotating the bitstream with network packet information specifying network packet boundaries. The system further includes a multiplexer. The system also includes a streaming apparatus that uses the network packet information to divide the bitstream into network packets for real-time streaming.

In still another aspect, the invention relates to a system for transmitting a compressed audio, video, or multimedia bitstream. The system comprising a means for separating a system stream into an audio stream and a video stream. The system also comprising a means for annotating the video stream with network packet information specifying network packet boundaries. The system further comprising a means for combining the audio and video streams into a modified system stream. The system additionally comprising a means for dividing the modified system bitstream into network packets for real-time streaming using the network packet information.

These and other features and advantages of the present invention will be described in the following description of the invention and associated Figures.

BRIEF DESCRIPTION OF THE DRAWINGS

FIG. 3C illustrates a more detailed illustration of an index included in the modified video stream formatted as a table in accordance with one embodiment of the present invention.

FIG. 3D illustrates the modified system stream after interleaving the modified the audio video stream and the modified audio stream in accordance with one embodiment of the present invention.

FIG. 4 illustrates the structure of an RTP data stream in accordance with one embodiment of the present invention.

DETAILED DESCRIPTION OF THE PREFERRED EMBODIMENTS

Figure 1A:
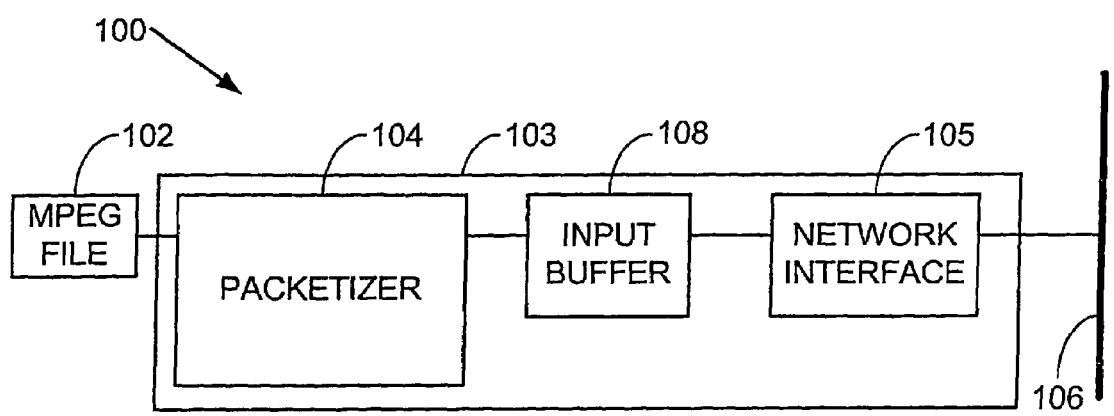
FIG. 1A illustrates a conventional system for packetizing MPEG files for network transmission.
Figure 1B:
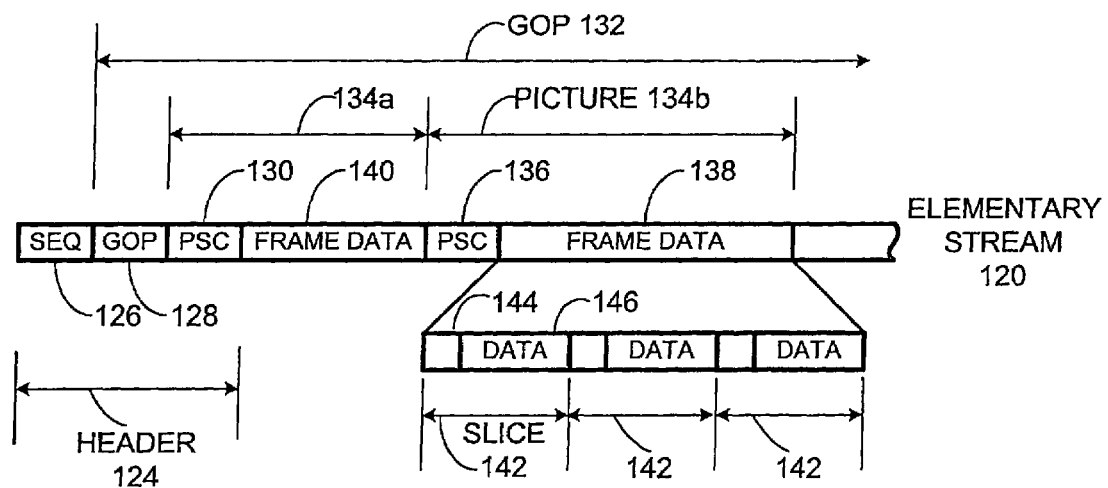
FIG. 1B illustrates an exemplary elementary MPEG stream, which may be found in the MPEG file.
Figure 1C:
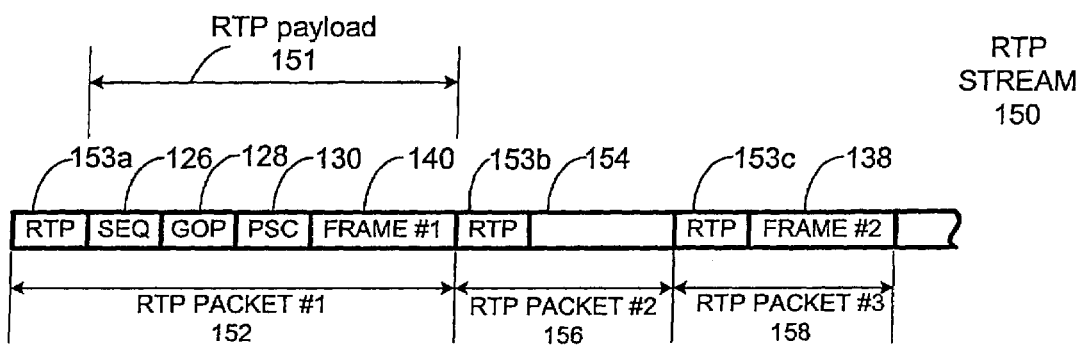
FIG. 1C illustrates an exemplary RTP stream, which includes the elementary MPEG stream after repacketization.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. For example, the invention is described primarily in terms of MPEG compressed files and RTP packetization. However, other media files and media compression techniques that permit user defined data such as H.261 may be employed. The H.261 protocol is detailed in ITU standard dated March 1993 and entitled "Line Transmission of Non-Telephone Signals, Video Codec for Audio-visual Services at px64 Kbits", which is incorporated herein for all purposes. The present invention may extend to bitstreams other than H.261 that have headers which start at arbitrary bit positions as opposed to byte positions. In this case, indices may refer to bits instead of bytes. Similarly, other network protocols, beyond RTP, may be employed to packetize the media files. These protocols are typically proprietary, and part of non-standard streaming applications. In some instances, well known process steps and/or structures have not been described in detail in order to not unnecessarily obscure the present invention.

In addition to the specific rules for RTP packetization described herein, the present invention may also conform to any rules provided by the RTP standard. The RTP protocols for converting an MPEG stream into RTP packetization for network transmission are detailed in RFC-2250 "RTP Payload Format for MPEG1/MPEG2 Video", January 1998 http://www.fags.org/rfcs/rfc2250.html, and RFC-1889 "RTP: A Transport Protocol for Real-Time Applications", January 1996 http://www.fags.org/rfcs/rfcl889.html. The RTP protocols for converting an H.261 stream into RTP packetization for network transmission are detailed in IETF standard RFC 2032 "RTP Payload format for H.261 Video Streams", October 1999.

As mentioned, the present invention finds particular use in with compressed MPEG data. In one embodiment, the present invention is suitable with the MPEG-1 specification, described in ISO/IEC International Standard 11172; "Coding of moving pictures and associated audio for digital storage media up to about 1.5 Mbits/s", November 1993, which is herein incorporated by reference. In another embodiment, the present invention is suitable with the MPEG-2 specification, described in ISO/IEC International Standard 13818; "Generic coding of moving pictures and associated audio information", November 1994, which is herein incorporated by reference.

The present invention provides a two phase process for transmitting MPEG data (or media data in another format) onto a network. In the first phase, data in the MPEG file is reformatted before real-time transmission into the network such that there is a one-to-one correspondence in size between MPEG packets and RTP packets. This reformatting occurs by parsing the MPEG data stream, determining where appropriate RTP packet boundaries should exist, and annotating the stream to indicate the RTP packet boundaries to be used in the transmission. Subsequently, when the data is to be sent onto the network, the modified MPEG stream is packetized into RTP network packets. As a result of reformatting the MPEG data prior to transmission, the real-time demands of MPEG to RTP conversion are simplified and CPU load on the transmitting server is reduced.

Figure 2A:
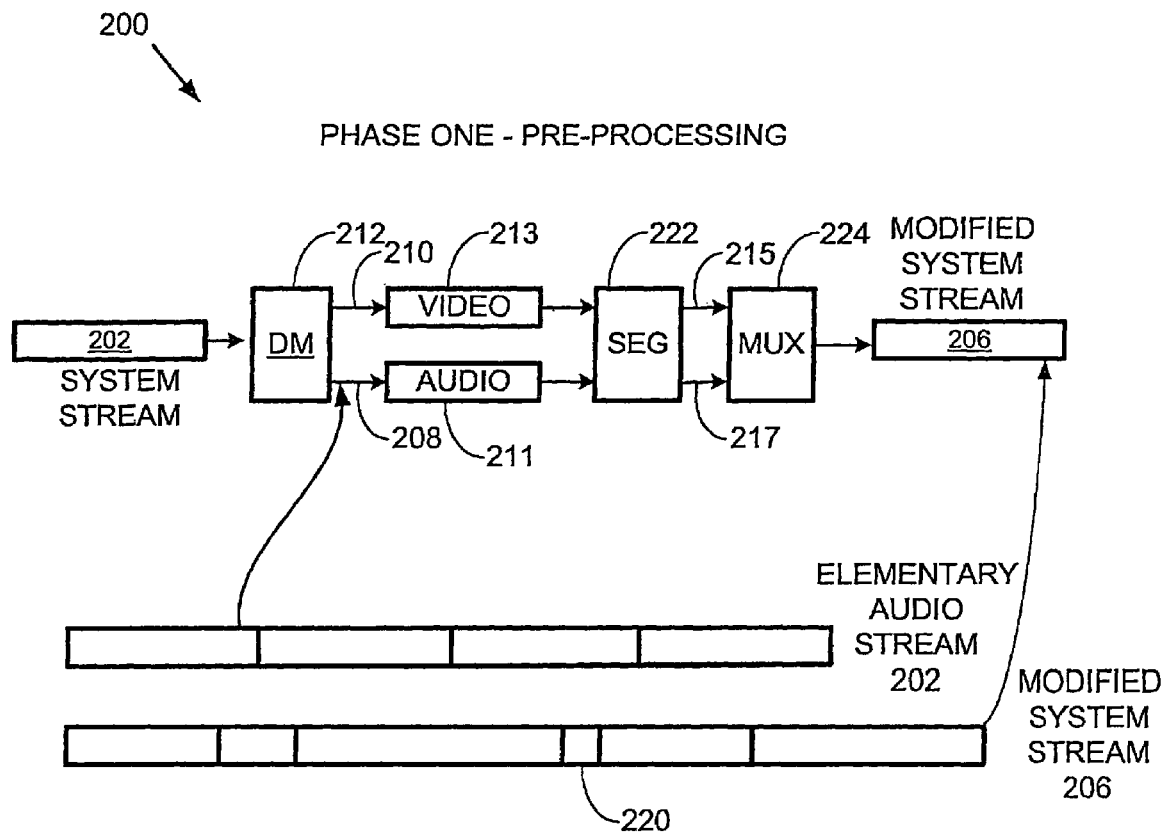
FIG. 2A illustrates a system for transmitting an MPEG data within a file onto a network in accordance with one embodiment of the present invention.
Figure 2A:
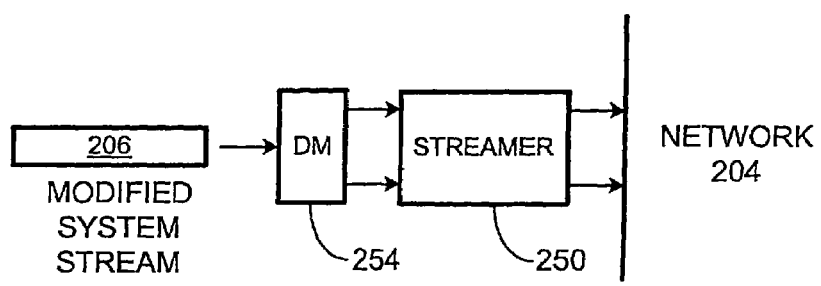

In one embodiment of the present invention, the MPEG file to be packetized is an MPEG system stream. FIG. 2A illustrates a system 200 for transmitting MPEG data from an MPEG file onto a network 204 in accordance with one embodiment of the present invention. The MPEG data is contained in an MPEG system stream 202, which is to be sent onto the network 204. To prepare the system stream 202 for transmission onto the network 204, the system stream 202 is preprocessed to a modified system stream 206.

Figure 2B:
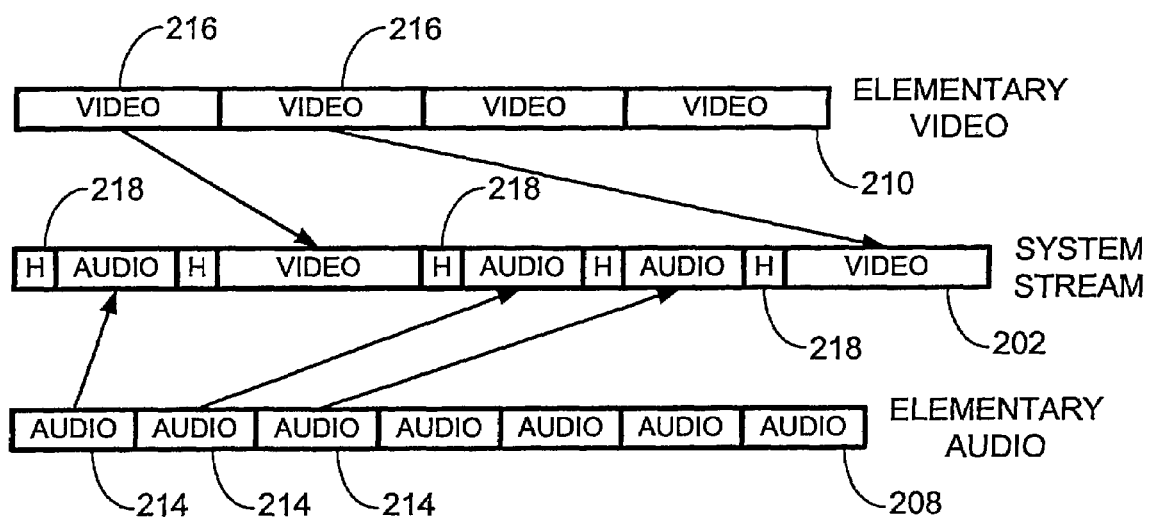
FIG. 2B illustrates one example of how an elementary audio stream and an elementary video stream may be combined to form the system stream.

As mentioned before, an MPEG file typically includes two elementary streams: an elementary audio stream and an elementary video stream. The elementary audio and video streams are intertwined to form a system stream within the MPEG file. As illustrated, the system 200 first separates the system stream 202 into its respective elementary audio stream 208 and its elementary video stream 210 using a demultiplexer 212. FIG. 2B presents one example of how elementary audio stream 208 and elementary video stream 210 may be combined to form the system stream 202. The elementary audio stream 208 and the elementary video stream 210 include blocks of audio data 214 and blocks of video data 216, respectively. The system stream 202 is then made by interleaving the audio blocks 214 and the video blocks 216. The system stream 202 also includes system headers 218 before each audio or video data block. The system headers 218 may inform the demultiplexer 212 whether the upcoming data block contains audio or video information.

The demultiplexer 212 may strip the system stream 202 of the system headers 218. After processing by the demultiplexer 212, the elementary audio stream 208 and the elementary video stream 210 are stored in an audio buffer 211 and a video buffer 213 respectively.

The elementary streams are fed to a segmenter 222, which parses and annotates them. As part of the parsing process, segmenter 222 preferably employs a Maximum Transmission Unit (MTU) length of the packet defined for the network onto which the data is to be transmitted. In one embodiment, the RTP packet size is made as large as possible without exceeding the MTU packet size. In many network protocols, the packets may have variable sizes. For example, the Ethernet protocol allows for different sized packets. In contrast, all ATM packets have the same size. Sometimes a packet payload is less than the maximum allowable length because maximizing the length would violate a constraint of the RTP protocol. For example, the payload of a packet may not meet the maximum length because to do so would require including a picture start code at a location other than the beginning of the payload. If this situation arose in an ATM packet, the payload would have to include at least some "padding" to meet the standard length. In the case of an Ethernet packet, the packet would simply be smaller than the maximum size.

In addition to parsing the bitstream to determine where the RTP packet boundaries should lie, segmenter 222 adds specific information to the elementary streams in order to indicate network packet boundaries. Examples of the added information, including packet headers, will be set forth below. In this example, the segmenter 222 outputs an annotated video stream, which contains annotations for both the video and audio stream.

A MUX 224 then combines the audio and video streams 215 and 217 into the modified system stream 206. The MUX 224 would also add the system headers back into the audio and video streams. Together, the demultiplexer 212, the segmentor 222 and the MUX 224 transform the system stream 202 into the modified system stream 206 whose MPEG packets have a one-to-one correspondence in size to the RTP packet size used for the network 204. In particular, the server will stream to data by removing the system headers from each MPEG packet and replace them with RTP packet headers. After this conversion, the RTP packet will have the MTU size of the network.

After reformatting, the modified system stream 206 has several characteristics. First, the modified system stream 206 and its corresponding reformatted MPEG file remain a valid MPEG file according to the MPEG file specification, and may be decoded by any MPEG decoder. If the decoder does not recognize the annotated RTP information in the system stream, it simply ignores the information and decodes per its normal routine. In addition, the modified system stream 206 is annotated with network packet information to facilitate transmission of the modified system stream 206. Further, the modified system stream 206 contains media packets, which are sized according to the network packets of the network 204.

As mentioned, a given network protocol will have a Maximum Transfer Unit (MTU) size. The segmentor 222 will create network packets that have as many bytes as possible without going over the MTU size. To create the network packets, the segmenter 222 reads data out of the audio buffer 211 and video buffer 213. Typically, the system stream 202, its corresponding elementary video stream 210 and the elementary audio stream 208 contain constant sized MPEG packets. In contrast, the modified system stream 206 contains MPEG packets that are sized according to the RTP packets used in transmission onto the network 204. In other words, the size of the MPEG packets in the modified system stream 206 may vary to match the size of the packets for RTP protocol.

The second phase of streaming in accordance with the present invention begins with a request for the MPEG data in the system stream 202 to be sent into the network 204. At this point, a streamer 250 obtains the modified system stream 206. Because the modified system stream 206 now specifies packet sizes corresponding to the RTP packet size used on the network, the streamer 250 may stream the data in an expeditious manner. The streamer 250 uses the annotated information in the modified system stream 206 to facilitate dividing the modified system stream into network packets. In one embodiment, this includes block copying of the data in the modified system stream into network packets.

Block copying consists of copying a continuous sequence of bytes, rather than copying bytes one at a time from a non-continuous source range. More specifically, using the network boundary information previously added to the modified system stream 206, the streamer 250 may identify the start and end point of packets in the modified system stream 206. In this manner, each of the packets within the modified system stream 206 may drop into an RTP packet without any parsing of the modified system stream 206. The streamer 250 may also add RTP headers before sending the data to the network. The streamer may also remove index information from the GOP header at the time of streaming.

In the embodiment shown in FIG. 2A, the modified system stream 206 is reformatted and demultiplexed by a demultiplexer 254 into two reformatted elementary stream files. This additional step reduces the need for the streamer 250 to perform a demultiplexing step, if necessary, when transmitting elementary streams onto the network. Additional details for the reformatting process including specific packetization systems and the addition of user added information will be described in further detail below.

The streamer 250 may be any server, streaming engine or streaming apparatus that transmits MPEG data via the RTP protocol. In some embodiments, the streamer 250 may implement MPEG file reformatting and, in some cases, may demultiplex the MPEG file. The present invention is suitable for use with a wide range of streamers which transmit MPEG data onto a network. By way of example, the present invention is suitable for use by a Cisco IPTV server as provided by Cisco Systems of San Jose, Calif.

In the event of a change in the target network 204, such as from an ATM to Ethernet, the MTU size may correspondingly change. In some cases, the reformatted MPEG file may be reformatted again. To this end, either the modified system stream 206 or the elementary stream 202 may be pre-processed such that the packet sizes now correspond to the new target network.

Having briefly discussed an exemplary general overview of the two phase streaming of the present invention, several aspects of reformatting and transmission in accordance with the present invention will now be expanded upon.

In one aspect of the present invention, reformatting an MPEG file includes the addition of network packet information to the MPEG stream. The network packet information may be added for several reformatting and processing purposes such as assisting the streamer 250 in building the network packet headers. Conventionally, the ability to add user-defined data to an MPEG file was intended for purposes unrelated to reformatting such as embedding copyright strings. To facilitate understanding of how the present invention adds network packet information during reformatting, a more detailed view of MPEG data streams suitable for use with the present invention will now be presented.

Figure 3A:
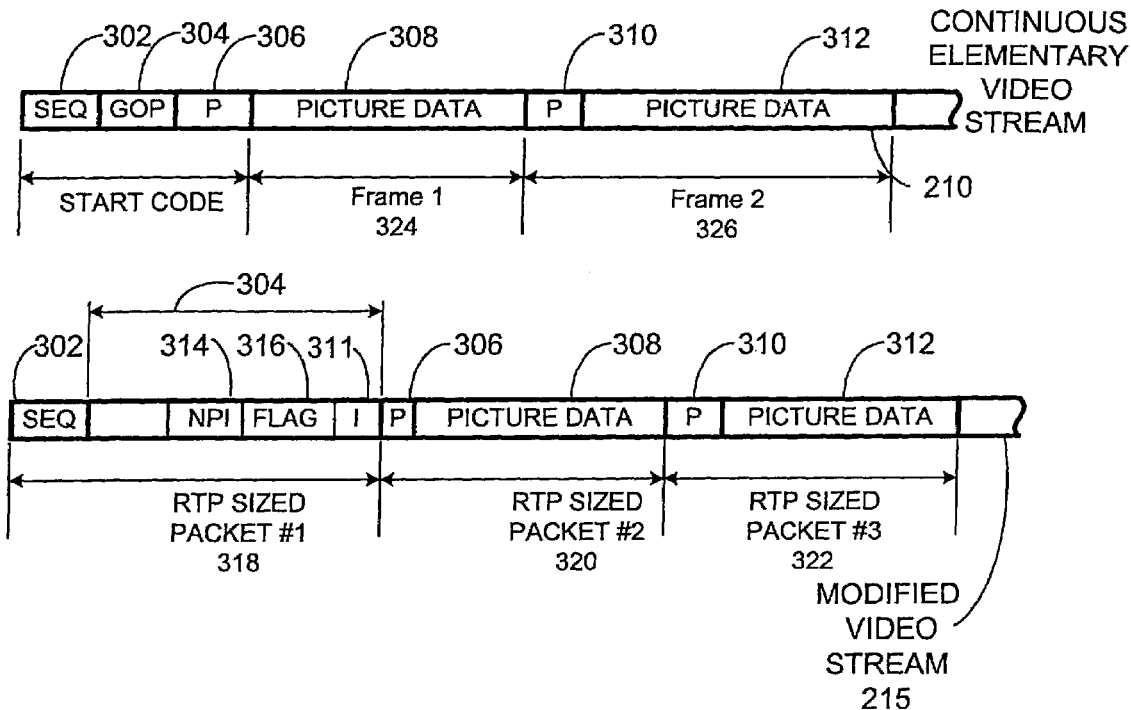
FIG. 3A illustrates the reformatting of the elementary video stream, as obtained from the system stream in FIG. 2A, into a modified video stream before interleaving into the modified system stream in accordance with one embodiment of the present invention.

FIG. 3A illustrates the transformation of the elementary video stream 210, as obtained from the system stream 202 in FIG. 2A, into the modified video stream 215 before interleaving into the modified system stream 206 in accordance with one embodiment of the present invention. The elementary video stream 210 includes start code indicating processing parameters for the elementary video stream 210 such as a sequence start code 302, a Group of Pictures (GOP) header 304, and a picture header 306. Picture data 308 follows the picture header 306. The elementary video stream 210 includes a second picture header 310 proceeding picture data 312.

The reformatting of the elementary video stream 210 to the modified video stream 215 includes the addition of network packet information 314 in the modified video stream 215. In one embodiment, the network packet information 314 is appended onto the sequence header 302 in the modified video stream 206. In another embodiment, the network packet information 314 is inserted within the GOP header 304. Addition of the network packet information 314 may be performed by the segmentor 222. The MPEG standards allow for a region in the GOP header to be used for user-defined information. Preferably, when the network packet information 314 is inserted within the GOP header 304, it is inserted in this space set aside for user defined information.

In one embodiment, the inserted information includes network packet information, which provides the starting byte indexes of MPEG packets corresponding to the GOP header 304. In a specific embodiment, the network packet information inside each GOP header 304 contains the starting byte indexes and lengths of each RTP data packet from the GOP. By knowing the exact location of each MPEG file data packet, the streamer 250 may expeditiously copy the data in blocks when repacketizing from the MPEG file to RTP packets.

The GOP 304 may also include other information. In one embodiment, the GOP header 304 provides part or all of the information necessary for the RTP header. More specifically, the GOP header 304 may include the RTP timestamps, which are derived from the PTS timestamps located in the MPEG file. The RTP timestamps list the timestamps of all frames in the GOP. The PTS timestamps (Presentation Time Stamps) are the timestamps used by the MPEG standard and are based on a 90 kHz clock. Thus, if the streamer 250 decides to dynamically drop frames, it can access the RTP timestamps information to decide which frames to drop. Alternatively, if the server 250 decides to loop the MPEG file, it can add an extra timestamps after returning to the beginning of the file. In one embodiment, the addition of the RTP header information may be performed by the segmentor 222.

The network packet information 314 may include an index 311 and a flag 316. The flag 316 indicates the pre-packetized status of the MPEG data. The flag 316 may then be detected by the streamer 250 to signal the streamer 250 to block copy the MPEG data from the RTP sized MPEG packets directly into RTP packets. In the embodiment shown, the index 311 is appended onto the GOP header 304 and contains information for all MPEG video system packets under the GOP header 304, as well as information for all MPEG audio system packets that occur before the next MPEG video packet that contains the next GOP header 304. For example, the index 311 provides the beginning and ending byte locations for the RTP sized MPEG packets included in the group of pictures pertaining to the GOP header 304. A similar index is appended onto each GOP in the system stream 202. Cumulatively, the index 311 and these additional indices provide the beginning and ending byte locations for each RTP size MPEG packet in the modified system stream 206. The index 311 contains reference to both audio and video MPEG packets included in the modified system stream 206. To obtain the information for the index 311, the segmentor 222 searches the elementary video stream 210 for its start code and headers. The index 311 is described further detail with respect to FIG. 3C.

After searching for and finding the start code and headers in the elementary video stream 210, the MPEG picture data is then re-sized into RTP sized packets. As mentioned before, this reformatting will depend on the MTU sizing inputs. For the elementary video stream 210 and the modified video stream 215, three RTP sized MPEG packets 318, 320 and 322 are used for the start code and first two frames 324 and 326. This reformatting of MPEG data in the elementary video stream 210 may then continue for the remainder of the elementary video stream 210 into a number of RTP sized packets based on the MTU sizing inputs. By way of example, a group of pictures may contain 15 frames which may be transformed into fifty RTP packets.

Figure 3B:
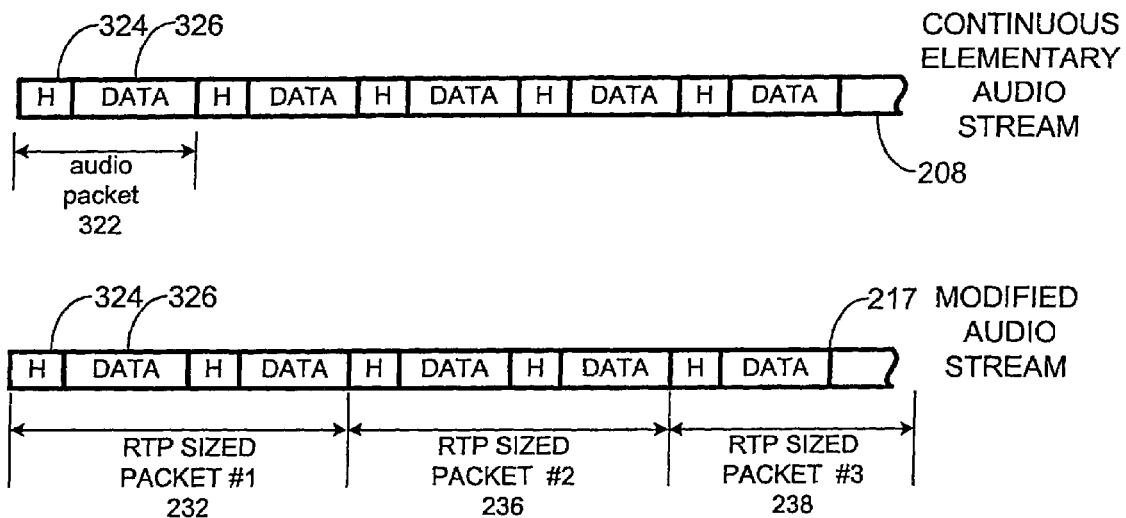
FIG. 3B illustrates the reformatting of the elementary audio stream, as obtained from the system stream in FIG. 2A, into a modified audio stream before interleaving into the modified system stream in accordance with one embodiment of present invention.

Reformatting is also performed for the elementary audio stream 208 which was separated from the system stream 202. FIG. 3B illustrates the reformatting of the elementary audio stream 208, as obtained from the system stream 202 in FIG. 2A, into a modified audio stream 217 before interleaving into the modified system stream 206 in accordance with one embodiment of present invention. Typically, each audio packet 322 has a header 324 and data 326. Together, the header 324 and the data 326 are often referred to as an audio frame. Conventionally, MPEG audio packets 322 are of a fixed size. Thus, the header 324 and the data 326 are typically of a fixed size. In one embodiment, and integer number of audio frames is placed within an RTP packet. By way of example, two audio frames may fit and be placed into each RTP sized MPEG packet 232, 236 and 238 as illustrated in FIG. 3B.

FIG. 3C illustrates a more detailed illustration of the index 311 included in the modified video stream 215 formatted as a table 350 in accordance with one embodiment of the present invention. The table 350 includes information related to the reformatting parameters of the modified system stream 206. The table 350 includes an entry 352 (a column) for each RTP sized packet in the modified system stream 206. The number of entries 352 will be determined by the MTU specification and the data within the elementary system stream 202. For example, the elementary system stream 202 may include fifteen video frames and thirty audio frames in a first group of pictures which may be reformatted into fifty video RTP sized MPEG packets and fifteen audio RTP sized MPEG packets. In this case, the table 350 would include sixty five entries 352 included in the first group of pictures header.

For each entry 352, the table 350 includes a type designation 354 describing the type of data in that particular packet, e.g. audio or video data, or an indicator that indicates the location of the next GOP. In addition, each entry 352 includes a byte position 356. In one embodiment, the byte position 356 points to a byte location in the MPEG stream corresponding to the beginning of the RTP sized MPEG packet for that entry. In a specific embodiment, the byte position 356 identifies the first bitstream byte to be included in a network packet corresponding to the entry 352. In another embodiment, the byte position 356 refers to a byte index from the beginning of the file to the beginning of the data portion of the packet. By way of example, four bytes may be reserved for this information. If the MPEG file exceeds 4 GB in size, the position 356 may wrap around.

Each entry may also include a length 358 which indicates the length in bytes of the data portion of the RTP sized MPEG packet. The length 358 may also be used to specify how many bytes from the stream RTP included in a network packet. Typically, this is determined by the MTU specification for the RTP packet to be used on the network 204. The length field 358 is not used when the next GOP location is indexed in the type designation 354. Each length 358 may be assigned two bytes for this information. In addition, the table 350 may include a final byte entry 360 which points to beginning of the next group of pictures.

In another specific embodiment, the index 311 includes RTP information to facilitate streaming onto the network 204. In this case, each entry in the index 311 may contain a byte index, a length index and an RTP header. The RTP header contains RTP header information used by the streamer 250 before the data is sent onto the network 204. In one embodiment, the RTP header may include RTP header parameters specified later upon streaming. Subsequently, upon transmission onto the network 204, these RTP header parameters may be modified by the streamer 250. By way of example, each RTP packet sent onto the network 204 contains a sequence number and an RTP timestamp. In a specific embodiment, both of these values are initiated in the modified system stream 206 with a random value. Upon transmission onto the network 204, the streamer 250 then adds a constant random offset to these values in the RTP index. In another embodiment, the RTP header includes the actual RTP header used in streaming except for the synchronization source. The synchronization source is used to identify the RTP stream and is added when the data is streamed onto the network. In one embodiment, the RTP header and header information are included in an RTP index. For video RTP sized MPEG packets, the size of the RTP header entry may be either twelve or sixteen bytes depending on whether the extended version of the RTP header is used according to RFC-2250. For audio RTP sized MPEG packets, the size of the RTP header entry may be twelve bytes in length.

Adding the information into the index 311 is an iterative process. More specifically, as each information is added, the byte locations for all data following the information are displaced an appropriate amount. As a result, each byte index in the table must correspondingly change following the information.

Having separated the system stream 202 into separate audio and video MPEG elementary streams 208 and 210, reformatted the audio and video elementary streams, and added user information which informs the streamer 250 of the reformatting; the modified packets of audio and video are now recombined into the modified system stream 206. In one embodiment, the audio and video packets are recombined according to the MPEG-1 specification for system streams, ISO-11172-1, Section 2.4.5.1, "Buffer Management", which incorporated herein by reference for all purposes. By way of example, the specification states that "For all ISO 11172 multiplexed streams, the delay caused by system target decoder input buffering shall be less than or equal to one second". In other words, this specification requires the packets of video and packets of audio which correspond to each other to not be more than 1 second worth of bitstream away from each other in the multiplex. Another specification requirement is that for each type of elementary stream, the data should appear in the same order as it appears in the elementary stream itself.

FIG. 3D illustrates the modified system stream 206 after interleaving the modified the video stream 215 and the modified audio stream 217 in accordance with one embodiment of the present invention. The modified system stream 206 is a system stream with multiplex video and audio that still contains MPEG system packets consisting of headers. At this point, the modified system stream 206 is still in the MPEG domain and may be played back by any MPEG decoder. In addition, the modified system stream 206 includes the user defined data, which was added to the modified video elementary stream 215, and takes into account the extra system header information as well as other streams in the multiplex. The modified system stream 206 includes RTP sized MPEG packets. In other words, the data portion of the MPEG packets in the modified system stream 206 are the appropriate size for direct insertion into the data portion of an RTP packet.

The modified system stream 206 typically begins with the sequence header 372. The sequence header 372 comprises a user defined space which includes network packet information useful for processing the modified system stream 206. The sequence header 372 may include the first instance of network packet information in the reformatted MPEG file. In one embodiment, the sequence header 372 includes network packet information which tags the reformatted MPEG file as a reformatted MPEG file for RTP packetization. In this manner, the streamer 250 knows to treat the file including the modified system stream 206 as a special case to take advantage of the pre-processing. In another embodiment, the sequence header 372 is copied from the beginning of the modified system stream 206 to be copied and reinjected before each GOP header 304. In this manner, a viewer may tune into the stream 206 at a point other than the beginning of the file transmission. By way of example, the modified system stream 206 includes also a system header 374 inserted at the beginning of each GOP. The system header 374 defines the modified system stream 206 as an MPEG stream including RTP sized MPEG packets.

To facilitate the streamer 250 which is responsible for block copying of the MPEG packets into RTP packets at transmission time, the streamer 250 must know the starting and ending points of all the RTP sized MPEG packets in the modified system stream 206. For this purpose, modified system stream 206 includes the index 311. The index 311 includes all the start points, and their sizes, of the RTP sized MPEG packets for the GOP 304 which the index 311 is appended to. More specifically, the index 311 points to a specific byte location in the stream for each RTP sized MPEG packet in the GOP 304. In addition, the index 311 includes a length which informs the streamer 250 how much data to block copy. In one embodiment, the length may be a pointer to a memory location. Correspondingly, the streamer 250 will not have to search or parse the system stream upon transmission.

In one embodiment where the network packet information is appended onto the GOP header 304, when the streamer 250 first obtains the modified system stream 206, it will have to parse the stream 206 until it finds the user information in the index 311 of the first GOP header 304. From this point, the transformation from MPEG domain into RTP packets may be performed by block copying of the MPEG data in the RTP sized MPEG packet of the modified system stream 206 into RTP packets. In one embodiment, the MPEG system headers are deleted from the MPEG data and the RTP headers are inserted. At this point, the RTP packets may be streamed onto the network 204.

FIG. 4 illustrates the structure of an RTP data stream 400 in accordance with one embodiment of the present invention. The RTP data stream 400 begins with a flag 402 which indicates that user added indexing is now being processed. The RTP data stream 400 then includes the MTU defined RTP header 404. An index 406 would then indicate the byte location of each RTP packet in the RTP data stream 400. A length 408 would then indicate the byte length of the MPEG data in each RTP packet. A type 410 would indicate whether the MPEG data in each RTP packet was audio or video data. The RTP data stream 400 would then include a second flag 412 which signals the end of the user added indexing. The RTP packets 414, 416 and 418 would then follow.

The present invention may take additional steps during repacketization to provide resilience against packet loss during transmission. For example, the segmenter 222 may include information inside each RTP header 404 to allow the viewer to more easily recover from packet loss. For MPEG to RTP repacketization, this information may consist of MPEG state variables which change according to difference values in the bitstream. Finally, the segmenter 222 may account for the possibility that the viewer may tune into the network bitstream at a point other than the beginning. In order to do this, the segmenter 222 may reinject data from the MPEG sequence header 302 into the modified stream 206, e.g. before each GOP 128, during the reformatting process.

Figure 5A:
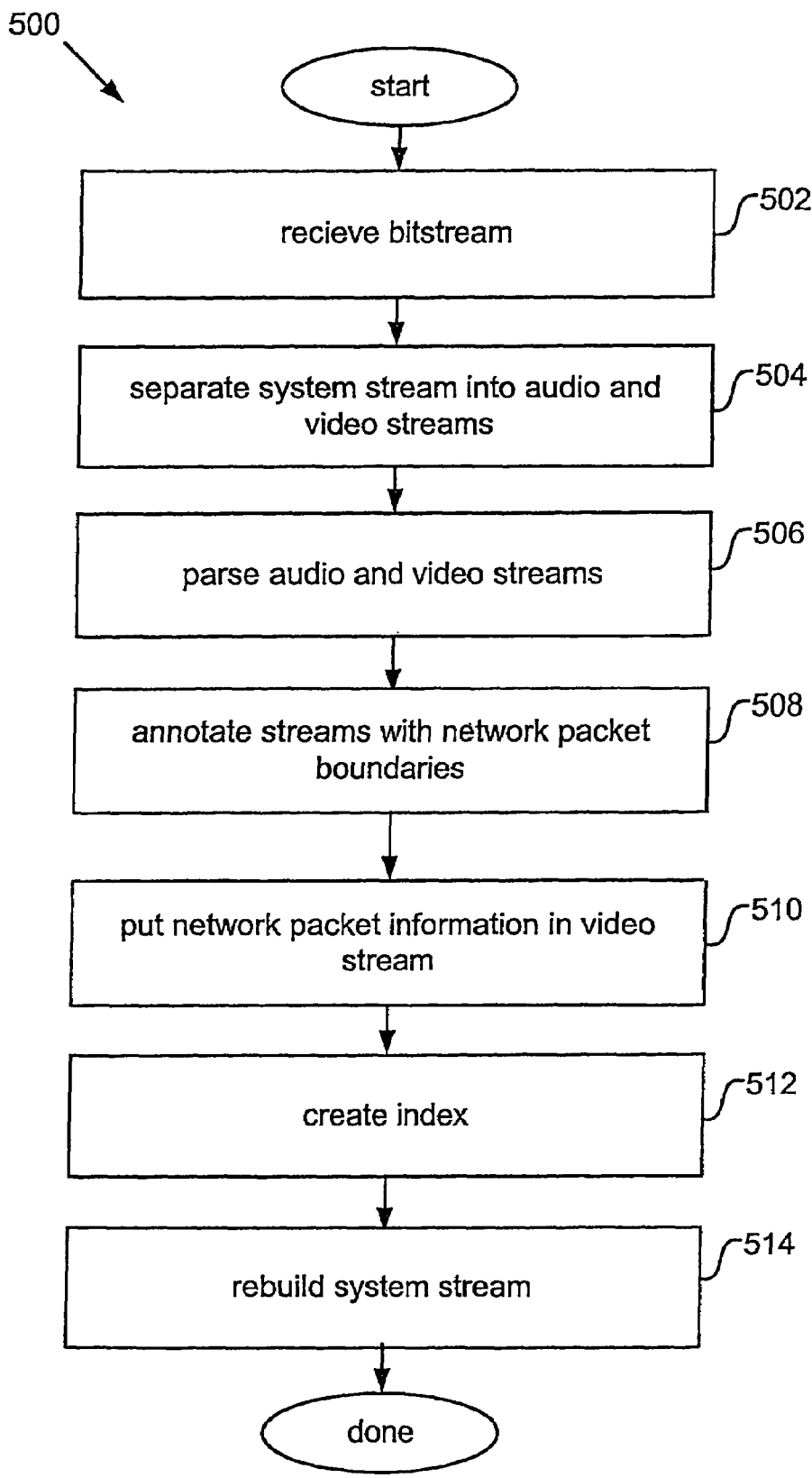
FIG. 5A illustrates a process flow for reformatting MPEG files in accordance with one embodiment of the present invention.

FIG. 5A illustrates a process flow 500 for reformatting MPEG files in accordance with one embodiment of the present invention. Processes in accordance with the present invention may include up to several additional steps not described or illustrated here in order not to obscure the present invention.

The process flow 500 typically begins with receiving a system stream (502). By way of example, the system stream may be obtained from a media file contained in a storage device such as a hard disk. For the process flow 500, the media file contains compressed and synchronized audio and video streams interleaved together into the system stream. The system stream is then separated into the audio and video streams (504). Each of the audio and video streams is then parsed to identify network packet boundaries within the each bitstream (506). The network packet boundaries refer to byte locations of network packets used when copying the system stream into network packets. The network packet boundaries may be identified, for example, by network packet sizes as specified by network protocol for the network to be transmitted onto. In addition, the network packet boundaries may be identified according to start codes in each bitstream. Each of the audio and video streams may then be annotated with the network packet boundaries (508).

The network packet information may be stored in one of the streams (510). In one embodiment, the network packet information is stored in the video stream. The network packet information may include an index (512). For each packet in the audio and video streams, the index may specify a byte position which identifies the first bitstream byte to be included in each network packet. For each packet in both streams, the index may also specify a length which designates how many bytes from the bitstream are to be included in a network packet. Further, the index may include a type designation specifying the type of data from the bitstream that is to be included in each network packet for each packet in both streams. After the network packet information has been added to the bitstreams, an annotated system stream is rebuilt from the annotated audio and video elementary streams (514).

Figure 5B:
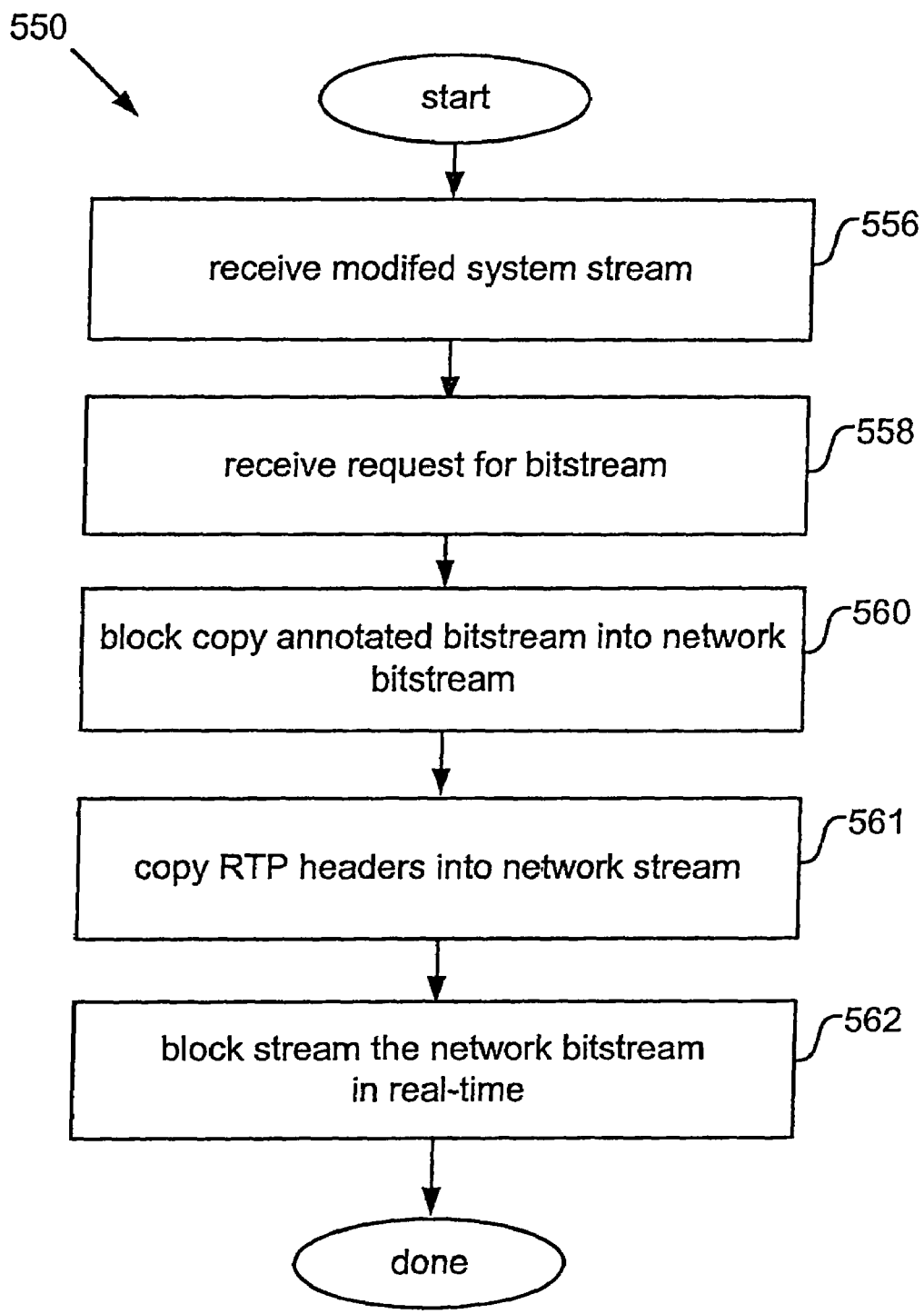
FIG. 5B illustrates a process flow for performing real-time streaming of a bitstream in accordance with one embodiment of the present invention.

FIG. 5B illustrates a process flow 550 for performing real-time streaming of a bitstream in accordance with one embodiment of the present invention. Processes in accordance with the present invention may include up to several additional steps not described or illustrated here in order not to obscure the present invention.

In the process flow 550, the streamer begins by obtaining the annotated bitstream and locating the network packet information in the bitstream (556). In accordance with one embodiment, to facilitate the streamer which is responsible for dividing the bitstream into network packets and block copying of the MPEG packets into network packets at transmission time, the streamer must know the starting and ending points of all the network sized MPEG packets in the modified system stream. For this purpose, the modified system stream includes an index. The index includes all the start points in the bitstream of the network sized MPEG packets for the GOP which the index is appended to. More specifically, the index points to a specific byte location in the stream for each network sized MPEG packet in the GOP. In addition, the index may include a length which informs the streamer how much data to block copy. In one embodiment, the length may be a pointer to a memory location. Correspondingly, the streamer will not have to search or parse the modified system stream upon transmission.

At some point, a streamer recives a request for the bitstream (558). In one embodiment where the network packet information is appended onto the GOP header, when the streamer first obtains the modified system stream, it will have to parse the stream until it finds the user information in the index of the first GOP header. From this point, the transformation from MPEG bitstream into network packets may be performed by block copying of the MPEG data in the network sized MPEG packet of the modified system stream into network packets (560). In one embodiment, the MPEG system headers are deleted from the MPEG data and the network headers are inserted. The RTP headers are then copied from the modified system stream, with some entries supplied by the streamer (561).

At this point, the network packets may be streamed onto the network by the streamer (562). The streamer transmits a series of network packets, each of which contains portions of data from the media file along with a network packet header. The network packet header includes additional information about the data useful for transmission in the network. In one embodiment, the network packets are block streamed in real-time. Generally speaking, real-time streaming refers a method where packets are transmitted onto a network at the time indicated by the packet's timestamp.

The methods of this present invention may be implemented on various systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Figure 6:
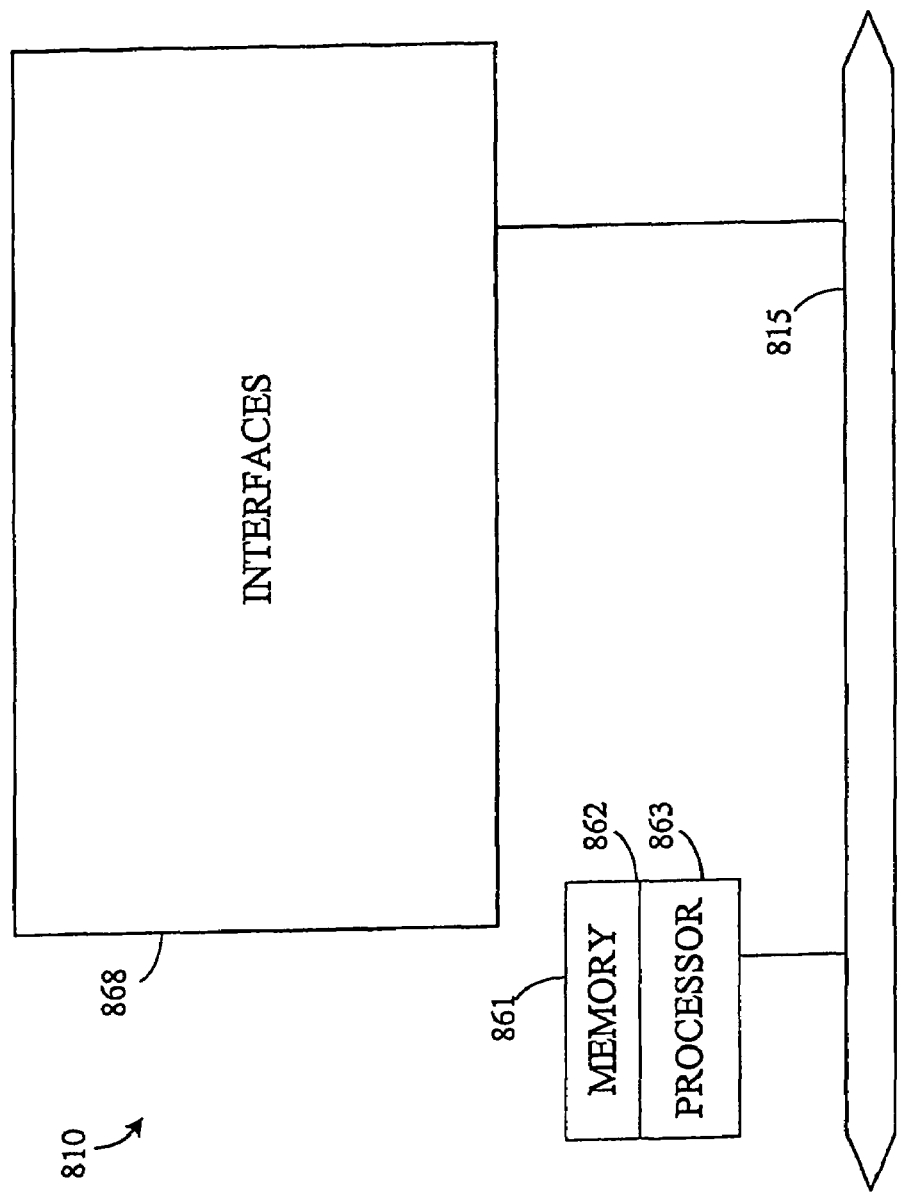
FIG. 6 illustrates a hardware architecture on which the present invention may be implemented.

Referring now to FIG. 6, a general purpose router 810 suitable for implementing the present invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It may also be responsible for parsing and annotating MPEG streams, etc. It preferably accomplishes all these functions under the control of software including an operating system (e.g., the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a preferred embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 861) configured to store program instructions for the network operations and other functions of the present invention described herein. The program instructions may specify an operating system and one or more applications, for example. Such memory or memories may also be configured to store data streams, data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Advantageously, the present invention increases streamer performance significantly by reformatting the MPEG file before real-time transmission. This significantly reduces the amount of parsing which occurs during real-time transmission. More specifically, the streamer no longer must parse the entire MPEG bitstream to find the data packet start and end points. Another advantage of the present invention is that reformatting the MPEG file allows the reformatting process to detect an error or corruption in the MPEG bitstream. Upon detection, the streamer may fix the error or alert the user of the error.

While this invention has been described in terms of several preferred embodiments, there are alterations, permutations, and equivalents which fall within the scope of this invention which have been omitted for brevity's sake. By way of example, even though the present invention has been discussed primarily with respect to media files containing both audio and video information, the present invention may be implemented with a media file comprising only audio or only video data. In addition, although the present invention has been discussed primarily with respect to MPEG media files, the present invention may be implemented with data in a media file encoded in any manner. It is therefore intended that the scope of the invention should be determined with reference to the appended claims.

What is claimed is:

1. A method of preparing a compressed audio, video, or multimedia bitstream to facilitate real time streaming of the bitstream, the method comprising:
   parsing the bitstream to identify network packet boundaries in the bitstream; and
   annotating a bitstream header with network packet information specifying the network packet boundaries such that a streaming apparatus can use the network packet information from the bitstream header to rapidly divide the bitstream into network packets for real-time streaming.

2. The method of claim 1 wherein the network packet information includes an index specifying a byte position in the bitstream, the byte position identifies the first bitstream byte to be included in a network packet.

3. The method of claim 2 wherein the index is included in a group of pictures header and the index includes starting and ending byte locations for MPEG packets included in a group of pictures associated with the group of pictures header.

4. The method of claim 2 further including separating the bitstream into an elementary audio stream and a elementary video stream.

5. The method of claim 4 further including inserting the index in one of the elementary audio stream and the elementary video stream.

6. The method of claim 5 wherein the index is inserted into the elementary video stream.

7. The method of claim 1 wherein the network packet information includes a length specifying how many bits from the bitstream are to be included in a network packet.

8. The method of claim 1 wherein the network packet information includes a type designation specifying the type of data from the bitstream that is to be included in a network packet.

9. The method of claim 1 wherein the network packet information includes an index specifying a byte position in the bitstream, the byte position identifies the first bitstream byte to be included in a network packet, a length specifying how many bytes from the bitstream are to be included in a network packet and a type designation specifying the type of data from the bitstream that is to be included in a network packet.

10. The method of claim 1 wherein the bitstream includes both audio and video data and wherein the network packet information specifies network packet boundaries for packets containing audio data and for packets containing video data.

11. The method of claim 10 further comprising combining an annotated video bitstream with an annotated audio bitstream to create a modified system stream.

12. The method of claim 11 wherein the modified system stream is an MPEG bitstream.

13. The method of claim 12 wherein the beginning of a network boundary is located according to start code included in the MPEG bitstream.

14. The method of claim 13 wherein the start code is one of a sequence header, a group of pictures header and a picture header.

15. The method of claim 1 wherein the network packet information includes network packet header information.

16. The method of claim 1 wherein the network packet boundaries are variably sized according to a network protocol.

17. The method of claim 1 wherein the network packet boundaries are a constant sized.

18. The method of claim 1 further including adding a flag to the bitstream which signals that the bitstream is annotated.

19. A computer program product comprising a machine readable medium on which is provided instructions for preparing a compressed audio, video, or multimedia bitstream to facilitate real-time streaming of the bitstream, the instructions comprising:
   parsing the bitstream to identify network packet boundaries in the bitstream; and
   annotating a bitstream header with network packet information specifying the network packet boundaries such that a streaming apparatus can use the network packet information from the bitstream header and rapidly divide the bitstream into network packets for real-time streaming.

20. The computer program product of claim 19 wherein the network packet information includes an index specifying a byte position in the bitstream, the byte position identifies the first bitstream byte to be included in a network packet, a length specifying how many bytes from the bitstream are to be included in a network packet and a type designation specifying the type of data from the bitstream that is to be included in a network packet.

21. The computer program product of claim 20 wherein the bitstream is an MPEG bitstream.

22. The computer program product of claim 21 wherein the index is appended onto a group of pictures header.

23. The computer program product of claim 19 wherein the bitstream includes both audio and video data and wherein the network packet information specifies network packet boundaries for packets containing audio data and for packets containing video data.

24. A method of performing real-time stream of a bitstream, the method comprising:
   parsing the bitstream to identify network packet boundaries in the bitstream;
   annotating a bitstream header with network packet information specifying the network packet boundaries;
   storing the annotated bitstream; and
   block streaming the bitstream in real-time using the network packet information from the bitstream header to divide the bitstream into network packets.

25. The method of claim 24 further including block copying data from the annotated bitstream into an RTP bitstream.

26. The method of claim 24 further including demultiplexing the bitstream.

27. The method of claim 24 wherein the bitstream includes an elementary video steam and an elementary audio stream.

28. The method of claim 27 wherein the bitstream is annotated with network packet information such that an integer number of audio frames in the elementary audio stream are included in each of the network packet boundaries.

29. A system for transmitting a compressed audio, video, or multimedia bitstream, the system comprising:
- a demultiplexer;
- a segmentor capable of annotating a bitstream sequence header with network packet information specifying network packet boundaries;
- a multiplexer; and
- a streaming apparatus that uses the network packet information from the bitstream sequence header to divide the bitstream into network packets for real-time streaming.

30. The system of claim 29 wherein the segmentor produces one of an annotated video stream or an annotated audio stream containing the network packet information.

31. The system of claim 29 wherein the demultiplexer produces an audio stream and a video stream.

32. The system of claim 31 further including one or more buffers that store the audio stream and the video stream.

33. The system of claim 31 further including a second demultiplexer.

34. The system of claim 29 wherein the multiplexer produces a modified bitstream including the network packet information specifying network packet boundaries.

35. The system of claim 34 further including a memory that stores the modified bitstream.

36. The system of claim 29 wherein the streaming apparatus uses a single block copy for a network packet for real-time streaming.

37. A system for transmitting a compressed audio, video, or multimedia bitstream, the system comprising:
- a demultiplexer for separating a system stream into an audio stream and a video stream;
- a segmentor for annotating Group of Pictures (GOP) header of the video stream with network packet information specifying network packet boundaries;
- a multiplexer for combining the audio and video streams into a modified system stream; and
- a streaming apparatus for dividing the modified system bitstream into network packets for real-time streaming using the network packet information from the Group of Pictures (GOP) header.

38. A system for transmitting a compressed audio, video, or multimedia bitstream, the system comprising:
- means for separating a system stream into an audio stream and a video stream;
- means for annotating a video stream header with network packet information specifying network packet boundaries;
- means for combining the audio and video streams into a modified system stream; and
- means for dividing the modified system bitstream into network packets for real-time streaming using the network packet information from the video stream header.

* * * * *